United States Patent Office 3,138,595
Patented June 23, 1964

3,138,595
N-(CYCLOALKYL)-PTERIDINECARBOXAMIDES
Thomas S. Osdene, West Chester, and Arthur A. Santilli, Ardmore, Pa., assignors to American Home Products Corporation, New York, N.Y., a corporation of Delaware
No Drawing. Filed Dec. 3, 1962, Ser. No. 241,489
2 Claims. (Cl. 260—251.5)

This invention relates to novel pteridine compounds having useful pharmacological properties and to a process for the production thereof.

More specifically, this invention is concerned with 4,7-diamino - N-(cycloalkyl)-2-aryl-6-pteridinecarboxamides and in particular with those represented by the general formula:

$$\text{Ar} \underset{N}{\overset{NH_2}{\bigvee}} \underset{N}{\overset{N}{\bigvee}} \underset{NH_2}{\overset{R}{\bigvee}} \text{CONCH(CH}_2)_n \quad (I)$$

where Ar is phenyl or a phenyl radical singly or doubly substituted by halogen, lower alkyl, lower haloalkyl, or lower alkoxy, R is hydrogen or lower alkyl and $n$ is an integer ranging from 2 to 7.

The novel compounds of the present invention exhibit diuretic and natriuretic activities. Some of them also exhibit antiviral activity.

The novel compounds of this invention are prepared by heating together in an anhydrous neutral polar solvent in the presence of a catalytic amount of a basic catalyst, a 4,6-diamino-5-nitroso-2-aryl-pyrimidine (II) with a 2-cyano-N-(cycloalkyl)acetamide (III). It is preferred, in this reaction, to use a slight excess of the acetamide usually in the ratio of 1.1 to 1. This reaction proceeds as illustrated by the following equation.

$$\text{Ar} \underset{N}{\overset{NH_2}{\bigvee}} \underset{NH_2}{\overset{N=O}{\bigvee}} + \underset{CN}{\overset{R}{\underset{CO}{\overset{N-CH(CH_2)_n}{\bigvee}}}} \longrightarrow$$
(II)          (III)

$$\text{Ar} \underset{N}{\overset{NH_2}{\bigvee}} \underset{N}{\overset{N}{\bigvee}} \underset{NH_2}{\overset{R}{\bigvee}} \text{CONCH(CH}_2)_n \quad (I)$$

Useful neutral polar solvents for this reaction are methanol, propanol, ethanol, butanol, glycol ethers such as 2-methoxyethanol, 2 ethoxyethanol, methoxy and ethoxy propanols, and amides such as dimethylformamide, and dimethyl acetamide. Suitable basic catalysts for promoting the reaction include the alkali metals, their alkoxides and their alkoxy alkoxides. Preferred among these is sodium α-ethoxyethoxide. The reaction temperatures range from about 60° to 200° C. and the reaction is preferably conducted at or near the boiling point of the selected solvent and under autogenous pressure. The product is purified preferably by dissolving it in dimethylformamide and by precipitating it with the addition of water.

The following examples in which all temperatures are in degrees centigrade illustrate the best mode of carrying out the invention.

*Example 1*

To a solution of 20.3 g. of ethyl cyanoacetate in 25 ml. of abolute ethanol was added 10 g. of cyclopropylamine. The solution was refluxed for 3 hours and allowed to stand overnight. The reaction mixture was cooled in ice and filtered by suction. There was obtained 13.1 g. of crude product, M.P. 103–106°. Recrystallization from ethanol afforded 2 - cyano - N - (cyclopropyl)acetamide, M.P. 103.5–105°.

*Analysis.*—Calculated: C=58.05, H=6.50, N=22.57. Found: C=57.94, H=6.40, N=22.36.

*Example 2*

A mixture of 17.0 g. of cyclopentylamine, 22.6 g. of ethyl cyanoacetate and 60 ml. of absolute ethanol was refluxed for 4 hours. The solvent was removed in vacuo on a rotary evaporator. The remaining oil partially solidified to a solid mass which was removed by filtration to give 13.4 g. of product, M.P. 80–83°. Recrystallization of the crude product from a mixture of cyclohexane and benzene gave 2-cyano-N-(cyclopentyl)acetamide, M.P. 87–88.5°.

*Anaylsis.*—Calculated: C=63.13, H=7.95, N=18.41. Found: C=62.97, H=8.10, N=18.57, 18.36.

*Example 3*

A mixture of 22.6 g. of cycloheptylamine, 22.6 g. of ethyl cyanoacetate and 60 ml. of absolute ethanol was refluxed for 4 hours. After removal of the solvent on the rotary evaporator, a thick oil remained which partially solidified and the solid was removed by filtration, wt. 21 g. Recrystallization from a mixture of water and ethanol afforded pure 2-cyano-N-(cycloheptyl)acetamide, M.P. 94–96.

*Analysis.*—Calculated: C=66.63, H=8.95, N=15.54. Found: C=66.97, 66.69; H=8.95, 9.21; N=15.68.

*Example 4*

To a solution of 22.6 g. of ethyl cyanoacetate in 60 ml. of absolute ethanol was added 25.4 g. of cyclooctylamine. The solution was refluxed for 4 hours and the solvent was removed in vacuo on a rotary evaporator. The remaining oil partially solidified on standing. Recrystallization of the solid from a mixture of water and ethanol afforded pure 2-cyano-N-(cyclooctyl)acetamide, M.P. 74–75.5°.

*Analysis.*—Calculated: C=68.00, H=9.34, N=14.42. Found: C=68.10, H=9.20, N=14.67.

*Example 5*

A mixture of 56.5 g. of N-methylcyclohexylamine, 56.5 g. of ethyl cyanoacetate and 100 ml. of absolute ethanol was refluxed for 5 hours. After removal of the solvent on the rotary evaporator a thick oil remained which solidified on cooling. The brown solid (90 g., M.P. 71–75°) was recrystallized from cyclohexane affording pure 2-cyano-N-cyclohexyl-N-methylacetamide, M.P. 84°.

*Anaylsis.*—Calculated: C=66.63, H=8.95, N=15.54. Found: C=67.21, H=8.66, N=15.37.

*Example 6*

To a solution of 0.2 g. of sodium metal in 500 ml. of absolute ethanol was added 6.45 g. to 4,6-diamino-5-nitroso-2-phenylpyrimidine. The mixture was brought to reflux temperature and 4.0 g. of 2-cyano-N-(cyclopropyl)acetamide was added. Refluxing was continued for 15 minutes during which time a yellow precipitate was deposited out of solution. Purification of this material by dissolving it in dimethylformamide followed by precipitation with water afforded 4,7-diamino-N-(cyclopropyl)-2-phenyl-6-pteridinecarboxamide, M.P. 342–348°.

*Analysis.*—Calculated: C=59.80, H=4.71, N=30.51. Found: C=60.07, H=4.53, N=30.64.

*Example 7*

To a stirred solution of 0.2 g. of sodium metal in 500 ml. of absolute ethanol was added 6.45 g. of 4,6-diamino- 5-nitroso-2-phenylpyrimidine. After bringing the mixture to reflux temperature there was added 5.3 g. of 2-cyano-N-(cyclopentyl)acetamide. After 1 minute a yellow crystalline material was deposited out of solution. Refluxing was continued for a total of 15 minutes, and after cooling, the precipitate was removed by filtration. Purification of the crude product by dissolving it in dimethylformamide followed by precipitation with water afforded 4,7 - diamino - N - (cyclopentyl)-2-phenyl-6-pteridinecarboxamide, M.P. 344–346.5°.

*Analysis.*—Calculated: C=61.87, H=5.45, N=28.06. Found: C=61.90, H=5.49, N=28.02.

Example 8

To a stirred solution of 0.2 g. of sodium metal in 500 ml. of absolute ethanol was added 6.45 g. of 4,6-diamino-5-nitroso-2-phenylpyrimidine. The mixture was brought to reflux temperature and 5.8 g. of 2-cyano-N-(cyclohexyl)acetamide was added. Refluxing was continued for 15 minutes after which time the mixture was cooled and a yellow precipitate was deposited. Purification of the product by dissolving it in dimethylformamide followed by precipitation with water gave 4,7-diamino-N-(cyclohexyl)-2-phenyl-6-pteridinecarboxamide, M.P. 350–355.

*Analysis.*—Calculated: C=62.79, H=5.82, N=26.98. Found: C=62.25, H=5.79, N=26.98.

Example 9

To a stirred solution of 0.2 g. of sodium metal in 500 ml. of absolute ethanol was added 6.45 g. of 4,6-diamino-5-nitroso-2-phenylpyrimidine. The mixture was brought to reflux temperature and 6.3 g. of 2-cyano-N-(cycloheptyl)acetamide was added. The mixture was boiled under reflux for 15 minutes during which time a yellow precipitate was deposited out of solution and after cooling, the precipitate was removed by filtration. Purification of the crude reaction product by dissolving it in dimethylformamide followed by precipitation with water yielded 4,7-diamino - N - (cycloheptyl)-2-phenyl-6-pteridinecyarboxamide, M.P. 350–352°.

*Analysis.*—Calculated: C=63.64, H=6.14, N=25.98. Found: C=63.47, H=6.27, N=26.18.

Example 10

To a solution of 0.2 g. of sodium metal in 500 ml. of absolute ethanol was added 6.5 g. of 4,6-diamino-5 - nitroso - 2 - phenylpyrimidine and after bringing the solution to reflux temperature there was added 6.79 g. of 2-cyano-N-(cyclooctyl)acetamide. After a few minutes a yellow precipitate was deposited out of solution. Refluxing was continued for a total of 15 minutes. After cooling, the product was removed by filtration and purification of the product by dissolution in dimethylformamide, followed by precipitation with water afforded 4,7 - diamino-N-(cyclooctyl)-2-phenyl-6-pteridinecarboxamide, M.P. 332–333°.

*Analysis.*—Calculated: C=64.43, H=6.44, N=25.05. Found: C=64.37, H=6.25, N=24.73.

Example 11

To a stirred solution of 0.2 g. of sodium metal in 500 ml. of absolute ethanol was added 6.45 g. of 4,6-diamino-5-nitroso-2-phenylpyrimidine. The mixture was brought to reflux temperature and 5.88 g. of 2-cyano-N-cyclohexyl-N-methylacetamide was added. Refluxing was continued for 15 minutes during which time a yellow precipitate was deposited out of solution. Purification of this material by dissolving it in dimethylformamide followed by precipitation with water afforded 4,7-diamino-N - cyclohexyl - N - methyl-2-phenyl-6-pteridinecarboxamide, M.P. 327.5–328.5°.

*Analysis.*—Calculated: C=63.64, H=6.14, N=25.98. Found: C=63.63, H=5.91, N=26.06.

Example 12

To a stirred solution of 0.2 g. of sodium metal in 500 ml. of absolute ethanol was added 6.87 g. of 4,6-diamino-5-nitroso-2-p-tolylpyrimidine. The mixture was brought to boiling point and 5.8 g. of 2-cyano-N-(cyclohexyl)acetamide was added. Refluxing was continued for 1 hour during which time a yellow precipitate was deposited out of solution. Purification of this material was effected by dissolving it in dimethylformamide followed by precipitation with water. 4,7-diamino-N-(cyclohexyl)-2-p-tolyl-6-pteridinecarboxamide, M.P. >360° was thus obtained.

*Analysis.*—Calculated: C=63.64, H=6.14, N=25.98. Found: C=63.64, H=6.40, N=26.01.

Example 13

2-cyano-N-(cyclobutyl)acetamide is made from 14.2 g. of cyclobutylamine and 22.6 g. of ethyl cyanoacetate as in Example 1.

Example 14

4,7-diamino - N - (cyclobutyl)-2-phenyl-6-pteridinecarboxamide is made by the reaction of 4,6-diamino-5-nitroso-2-phenylpyrimidine with 4.5 g. of 2-cyano-N-(cyclobutyl)acetamide as in Example 6.

Example 15

4,7-diamino-N-(cyclopropyl)-2-(p - tolyl) - 6 - pteridinecarboxamide is made by the reaction of 6.87 g. of 4,6-diamino-5-nitroso-2-(p-tolyl)pyrimidine with 4.0 g. of 2-cyano-N-(cyclopropyl)acetamide as in Example 6.

Example 16

4,7-diamino-N - (cyclopentyl) - 2 - (p-methoxyphenyl)-6-pteridinecarboxamide is made by the reaction of 7.35 g. of 4,6-diamino-2-(p-methoxyphenyl)-5-nitrosopyrimidine with 5.3 g. of 2-cyano-N-(cyclopentyl)acetamide as in Example 7.

Example 17

4,7 - diamino - 2-(p-chlorophenyl)-N-(cycloheptyl)-6-pteridinecarboxamide is made by the reaction of 7.49 g. of 4,6 - diamino - 2-(p-chlorophenyl)-5-nitrosopyrimidine with 6.3 g. of 2-cyano-N-(cycloheptyl)acetamide as in Example 9.

Example 18

4,7 - diamino - N-(cyclooctyl)-2-(o-tolyl)-6-pteridinecarboxamide is made by the reaction of 6.87 g. of 4,6-diamino-5-nitroso-2-(o-tolyl)pyrimidine with 6.79 g. of 2-cyano-N-(cyclooctyl)acetamide as in Example 10.

Example 19

4,7 - diamino - N-(cycloheptyl)-2-(m-trifluoromethylphenyl - 6 - pteridinecarboxamide is made by the reaction of 8.49 g. of 4,6-diamino-5-nitroso-2-(m-trifluoromethylphenyl)pyrimidine with 6.3 g. of 2-cyano-N-cycloheptyl)-acetamide, as in Example 9.

Example 20

4,7 - diamino-2-(3,4 - dichlorophenyl) - N - cyclopropyl-6-pteridinecarboxamide is made by the reaction of 8.52 g. of 4,6-diamino-2-(3,4-dichlorophenyl)-5-nitrosopyrimidine with 4.1 g. of 2-cyano-N-(cyclopropyl)acetamide as in Example 6.

The compounds of this invention, which have proven useful in experimental pharmacology, can be administered in a wide variety of oral or parenteral unit dosage forms singly, or in admixture with other active compounds.

The present invention also includes the process of bringing the compounds thereof into a form suitable for therapeutic administration by associating them with liquid or solid pharmaceutical carriers.

Various changes and modifications of this invention can be made by those skilled in the art to which it relates and to the extent that such variations incorporate the spirit of the invention, they are included in the scope of the claims.

What is claimed is:
1. A compound of the formula:

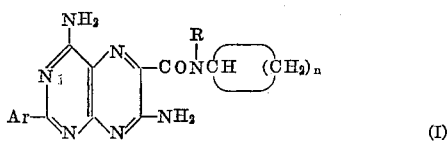

(I)

wherein Ar is a member of the group consisting of phenyl and phenyl substituted by at least one member of the group consisting of halogen, lower alkyl, halo (lower)alkyl and lower alkoxy; R is selected from the group consisting of hydrogen and lower alkyl and $n$ is an integer ranging from 2 to 3.

2. 4,7-diamino - N - (cyclopropyl) - 2 - phenyl-6-pteridinecarboxamide.

References Cited in the file of this patent
UNITED STATES PATENTS
2,975,180   Osdene et al. _____ Mar. 14, 1960

OTHER REFERENCES
Fieser: Organic Chemistry, 3rd edition, 1956, pages 46–7.